Figure 1:
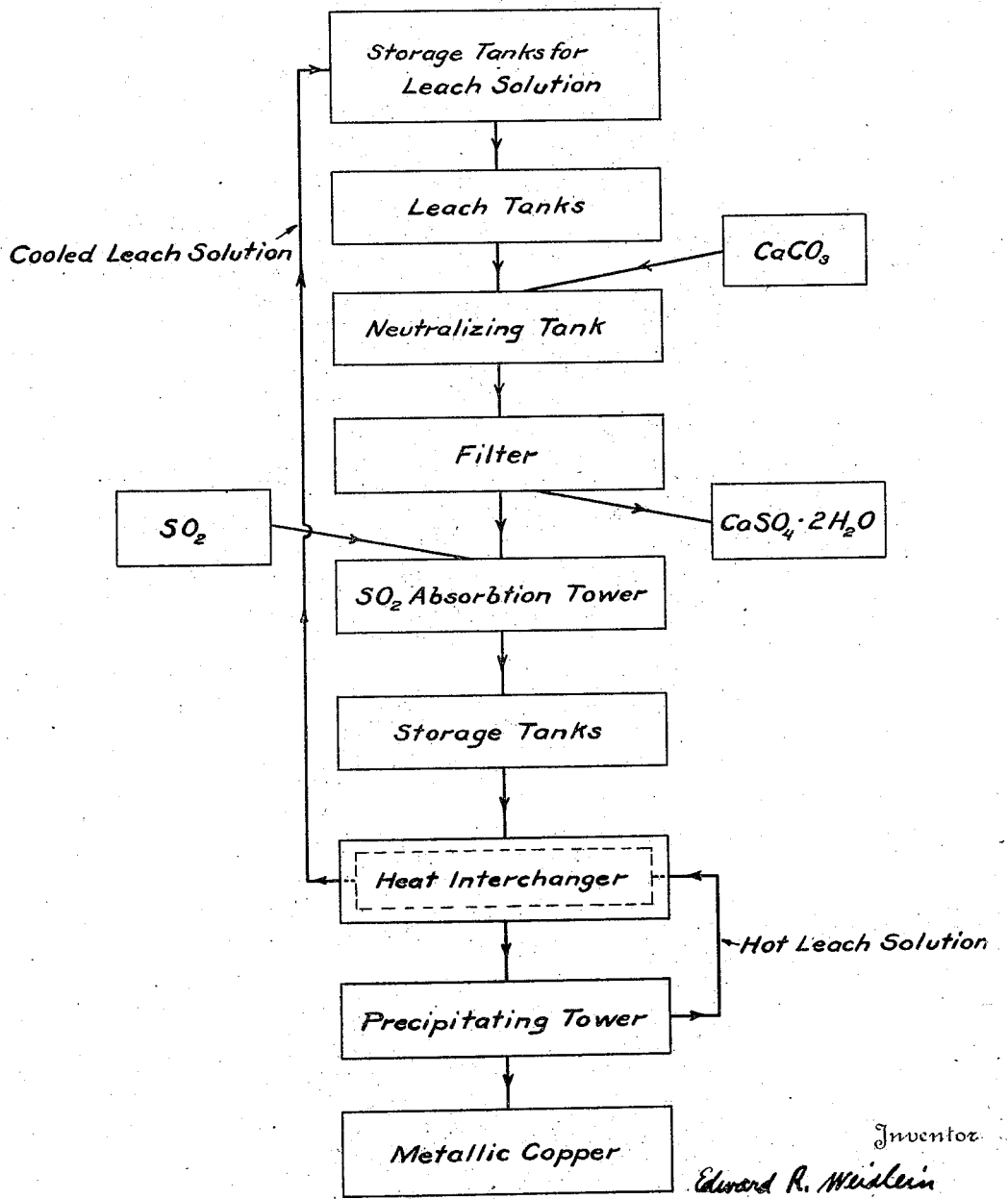

E. R. WEIDLEIN.
HYDROMETALLURGY OF COPPER.
APPLICATION FILED AUG. 31, 1915.

1,201,899.

Patented Oct. 17, 1916.

E. R. WEIDLEIN.
HYDROMETALLURGY OF COPPER.
APPLICATION FILED AUG. 31, 1915.

1,201,899.

Patented Oct. 17, 1916.
2 SHEETS—SHEET 2.

INVENTOR
Edward R. Weidlein
BY
Pennie Davis & Marvin
ATTORNEYS

UNITED STATES PATENT OFFICE.

EDWARD RAY WEIDLEIN, OF THOMPSON, NEVADA, ASSIGNOR TO METALS RESEARCH COMPANY, OF NEW YORK, N. Y., A CORPORATION OF MAINE.

HYDROMETALLURGY OF COPPER.

1,201,899.  Specification of Letters Patent.  Patented Oct. 17, 1916.

Application filed August 31, 1915. Serial No. 48,150.

*To all whom it may concern:*

Be it known that I, EDWARD RAY WEIDLEIN, a citizen of the United States, residing at Thompson, county of Lyon, State of Nevada, have invented certain new and useful Improvements in Hydrometallurgy of Copper; and I do hereby declare the following to be a full, clear, and exact description of the invention, such as will enable others skilled in the art to which it appertains to make and use the same.

This invention relates to the recovery of copper in a wet way, from its ores.

In my prior Patent No. 1,089,096, granted March 3, 1914, I have described and claimed the extraction of copper from copper bearing material by means of sulfuric acid and the precipitation of the copper from the resulting copper sulfate solution by treatment with sulfur dioxid at a suitable temperature and pressure. This precipitation of copper is based generally upon the reversible reaction

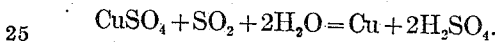
$$CuSO_4 + SO_2 + 2H_2O = Cu + 2H_2SO_4.$$

In the preferred practice of the invention, as described in said prior patent, the ore is leached with a 3.6% sulfuric acid solution, the free acid is then neutralized, and the copper sulfate solution containing about 1.5% copper is mixed with an approximately equal amount of sulfur dioxid and then heated in the precipitating tank or tanks to a temperature of about 150° C. and a pressure of about 100 pounds per square inch. Under these conditions the copper is precipitated substantially quantitatively and a leach solution is produced suitable for re-leaching purposes.

In said prior patent it was proposed to leach with the solution as it comes hot from the precipitation tanks, thereby utilizing its maximum leaching efficiency, and making the process continuous in the sense that the leaching solution is utilized over and over again for re-leaching the ore, after the copper has been precipitated each time out of the solution. I have now found that the process can be carried on more advantageously by making it continuous in the sense that the solution is continuously passing through the precipitating tank or tanks and is continuously heated therein, thereby precipitating the copper and regenerating the sulfuric acid. I have further found it to be much more advantageous to utilize the waste heat in the solution coming from the precipitating tank to heat up the ingoing solution, instead of leaching the ore directly with this hot solution. As a result of this heat interchange the copper sulfate solution is preheated and the precipitating reaction is thereby facilitated, while the cooling of the hot leach solution makes it also more efficient in that the acid losses are materially reduced by the use of a cooler leaching or extracting acid.

I will now proceed to describe my invention more in detail, with particular reference to the apparatus illustrated, more or less diagrammatic, upon the accompanying drawings, but it is intended and understood that the invention will be illustrated by, but is not limited to, the specific embodiments thus illustrated and described.

Figure 2:
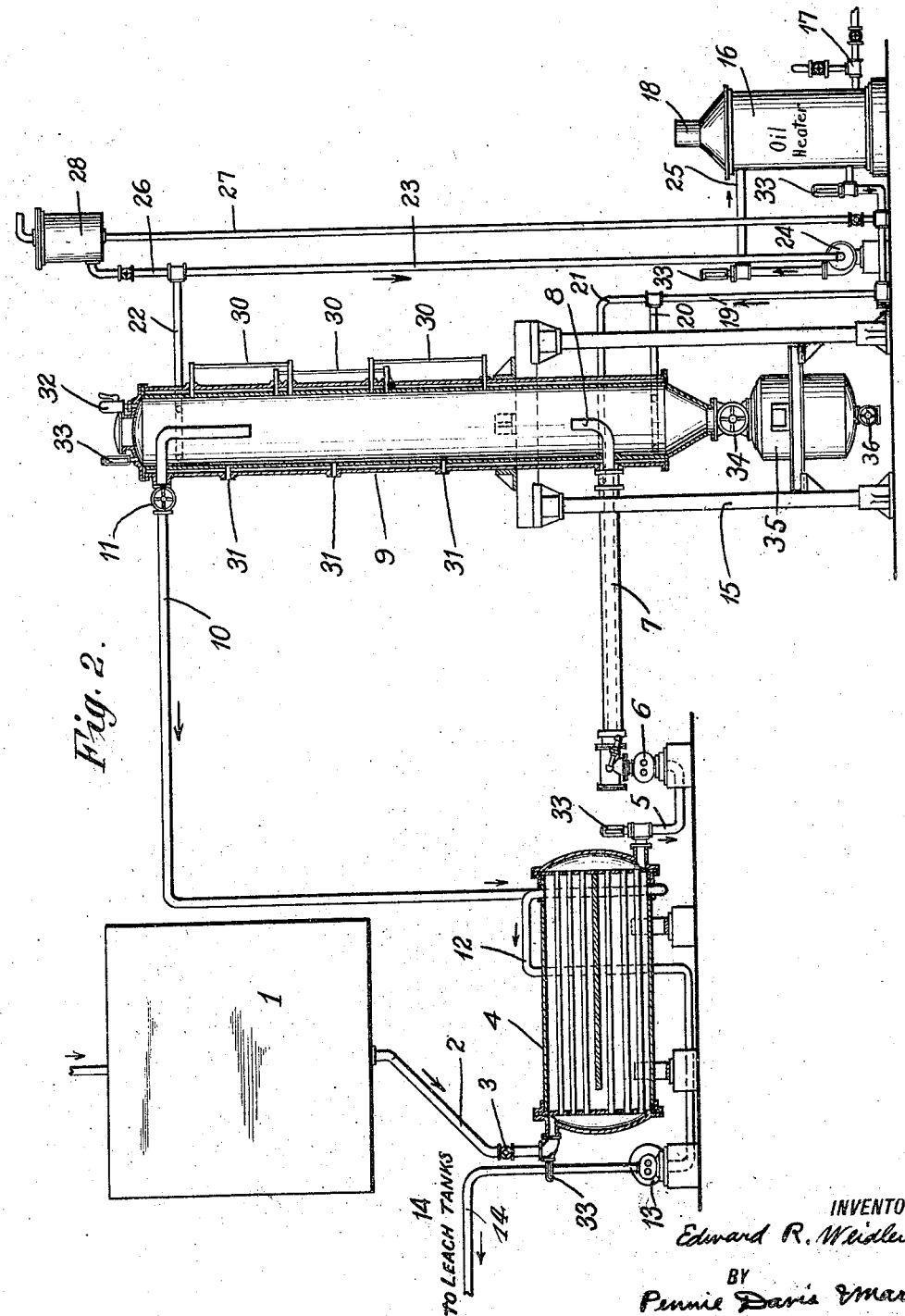

In the accompanying drawings, Figure 1 shows a diagrammatic arrangement of apparatus in which the novel process of the invention can be practised, and Fig. 2 shows, partly in section, and partly in elevation, the reciprocating and heat interchanging parts of the apparatus.

Referring first to Fig. 2, the storage tank for the copper sulfate solution, after having been neutralized and charged with sulfur dioxid, is indicated at 1, and is provided with an outlet 2, having therein a regulating valve 3, leading to the heat interchanger 4 of any suitable or preferred construction. From this heat interchanger, the solution passes through the pipe 5 to the pump 6, by means of which it is forced into the precipitating tank 9 under a suitable pressure of, for example, 100 pounds per square inch. The pipe leading from the pump 6 to the precipitating tank is provided with an outer oil jacket 7, and has an upwardly arranged discharge end 8 within the tank. From the top of this tank the solution or liquor is withdrawn by means of the pipe 10, provided with a suitable regulating valve 11, and is returned thereby to the heat interchanger 4, from which it is in turn forced through the pipes 12 and 14 by means of the pump 13 back to the leach tanks.

The precipitating tank or chamber 9 is suitably supported upon supports 15 and is provided with an outer double wall or other suitable means for heating by means of oil. Such oil heating I have found to be particularly suitable for maintaining the necessary temperature within the precipitating tank. The oil heater is illustrated at 16, provided with suitable air and gas inlets 17 and with a funnel or chimney 18. From the heater the oil passes by means of the pipe 19, in part through the branch 20 to the double wall of the precipitating tank, and in part by the branch 21 to the oil jacket 7, from which it is then discharged into the double jacket of the precipitating tank. The oil is drawn off from the top of the jacket by means of the pipe 22 and the pipe 23 leading to the pump 24 by means of which the oil is returned to the heater through the pipe 25, and the circulation of the oil effected. An oil expansion tank 28 is arranged above the top of the circulatory system and is suitably connected thereto by means of pipes 26 and 27.

The precipitating tank is provided with liquid gages 30 for determining the level of the liquid therein, and with openings 31 for the introduction of thermometers. It is also provided at its top with a safety valve and with a thermometer 33. Similar thermometers 33 are also provided at various points of the apparatus for indicating the temperature.

The apparatus of Fig. 2, corresponds to the heat interchanger and precipitating tower of the diagram of Fig. 1. From the heat interchanger the cooled leach solution is returned to a suitable storage tank or tanks from which it is drawn, as required, into the leach tanks. The ore or other copper bearing material is introduced into the leach tanks and there leached with the cooled sulfuric acid leach solution. The excess acid is then neutralized by the addition of calcium carbonate or ordinary limestone, and the precipitated gypsum is suitably removed by siphoning, filtering or otherwise; or the excess acid can be neutralized by the use of any other suitable alkaline substance. This copper sulfate solution should, in the preferred practice of the invention, contain about 1.5% of copper. Sulfur dioxid is next forced into the copper sulfate solution, in suitable amount, and the solution is then stored in suitable storage tanks, one of which is indicated in Fig. 2, from which the solution is drawn off and passed to the heat interchanger 4, where it is preheated by the hot leach liquor coming from the top of the precipitating tower, in the manner already indicated. The pre-heated copper sulfate solution is forced under a suitable pressure, and in a continuous manner, into the bottom of the precipitating tank 9 through the oil jacket pipe 7, in which it is further preheated. During the passage up through the precipitating tank the copper sulfate solution mixed with the sulfur dioxid is heated to the necessary temperature of about 150° C., at which temperature the copper is precipitated. I have found that the time factor plays a very small part in the reversible reaction which results in this precipitation, and that just as soon as the proper conditions of temperature and pressure are reached (100 pounds pressure and 150° C.), the reaction is complete. The precipitation of the copper is accompanied by the regeneration of twice as much sulfuric acid as theoretically required for extracting a corresponding amount of copper. The leach liquor thus produced is led off through the pipe 10 to the heat interchanger where it serves to pre-heat the copper sulfate solution and where it is itself cooled. The solution can thus be cooled below the boiling point, from the much higher temperature of the precipitating tank. By thus cooling the leach liquor before utilizing it for extracting further amounts of ore, the acid losses in the hot solution can be materially reduced. Thus, it is possible to cool the outgoing solution from about 150° C. or 160° C. down to about 90° C., and at the same time raise the temperature of the ingoing solution from about 20° C. to about 90° C.

Inasmuch as the precipitation reaction results in the production of twice as much $H_2SO_4$ as is theoretically necessary to extract a corresponding amount of copper from the ore, the excess acid may be in part utilized for some other purpose than leaching the ore, as will be readily understood. There may, however, be some loss of acid during the extraction, in dissolving iron or other constituents, and there will usually be some excess of acid to be neutralized after the leaching of the ore, so that a greater or less excess of acid is desirable for the leaching operation.

It will be seen that the precipitation is carried on in a continuous manner, the pre-heated copper sulfate solution, together with the sulfur dioxid, being forced into the bottom of the precipitating tank in a continuous manner, and being continuously withdrawn at the top after the precipitation of the copper therefrom. The precipitating tank or tower is of suitable height, and should with advantage have such a height as will permit the heating therein of the copper sulfate solution together with the sulfur dioxid to the precipitating temperature, i. e., 150° C., although in the upper part of the apparatus this temperature may be exceeded. Since the reaction is complete as soon as the proper temperature and pressure are attained, the copper will be then precipitated and will fall to the bottom of the precipitating tank, being thus withdrawn from the upper and hotter part of the tank into the cooler parts below.

From the bottom of the precipitating tank the copper can be withdrawn, without interfering with the continuous operation of the process, by means of the valve or false bottom 34, into the lower compartment 35, provided with a suitable outlet 36.

The constant pressure can be maintained within the precipitating tank by suitable regulation of the pump 6 and by means of the safety valve 32 set at a pressure of 100 pounds. The temperature can be regulated by the automatic recording gages or thermometers, and by the regulation of the oil heater. It will be seen that the heated oil is circulated into heat interchanging relation with the liquid within the precipitating tank; and that in the particular apparatus illustrated, this circulation is effected through the surrounding jacket of the precipitating tank and of the inlet pipe 7. Other suitable or equivalent methods of effecting the necessary heat interchange between the oil and the liquid within the precipitating tank will operate in a similar manner.

With a tank such as illustrated, of about three feet in diameter and 20 feet high, having a capacity of about 1000 gallons of solution, it is possible to handle from 50,000 to 100,000 gallons of solution during 24 hours, the circulation of the solution and the operation of the process being effected in a continuous manner, such as above described, and substantially complete precipitation of the copper being obtained.

From the foregoing description it will be seen that the process is a continuous one in the sense that the circulation of the reacting solution through the precipitating apparatus is effected in a continuous manner with resulting continuous precipitation of the copper therefrom. It will also be seen that the resulting hot leach liquor is cooled before extraction of the ore therefrom and that the copper sulfate solution is itself thereby preheated, with the result that the copper sulfate solution enters the precipitating tank already partly heated to the precipitating temperature, and the leach liquor enters the leaching tank sufficiently cooled to prevent objectionable loss of the acid. While the conditions of the reaction indicated are those which in practice have been found to give particularly good results, yet it will be understood that variations and modifications can be made therein without departing from the spirit and scope of the invention, as set forth in the accompanying claims.

I claim:

1. The method of precipitating copper from copper sulfate solutions by means of sulfur dioxid, which comprises circulating such solution, together with the sulfur dioxid, in a continuous manner through a precipitating apparatus and heating the same therein to a sufficient temperature and pressure to effect precipitation of the copper and form a residual leach liquor of relatively low percentage in copper as compared with its original copper content, drawing off such leach liquor in a continuous manner, and circulating the same and the ingoing solution in heat interchanging relation with each other, and thereby cooling the hot leach liquor and preheating the ingoing solution; substantially as described.

2. The method of extracting copper from ores, roasted matte, and other copper bearing material, which comprises leaching the material with sulfuric acid to obtain a suitable copper sulfate solution, heating such solution with sulfur dioxid to a suitable temperature and pressure to effect precipitation of the copper and form a residual leach liquor of relatively low percentage in copper as compared with its original copper content, drawing off such leach liquor and circulating the same and the copper sulfate solution before precipitation in heat interchanging relation with each other, and thereby cooling the hot leach liquor and preheating the copper sulfate solution, and utilizing the cooled leach liquor to extract a further portion of copper from the ore or other material treated; substantially as described.

3. The method of extracting copper from ores, roasted matte, and other copper bearing material, which comprises leaching the material with sulfuric acid to obtain a suitable copper sulfate solution, circulating such solution, together with the sulfur dioxid, in a continuous manner through a precipitating apparatus, and heating the same therein to a sufficient temperature and pressure to effect precipitation of the copper and form a residual leach liquor of relatively low percentage in copper as compared with its original copper content, drawing off such leach liquor in a continuous manner, and circulating the same and the ingoing solution in heat interchanging relation with each other, and thereby cooling the hot leach liquor and preheating the ingoing solution, utilizing the cooled leach liquor to extract a further portion of copper from the ore or other material treated, neutralizing the excess acid in the resulting copper sulfate solution, and continuing the process by circulating the neutralized solution in heat interchanging relation with further amounts of hot leach liquor, and thereby preheating the same, and thence through the precipitating apparatus in the manner indicated; substantially as described.

4. The method of precipitating copper from copper sulfate solutions by means of sulfur dioxid, which comprises circulating such solution, together with the sulfur dioxid, in a continuous manner upwardly through a precipitating tank of considerable height and heating the same in its passage upwardly therethrough to a sufficient temperature and pressure to effect precipitation of the copper and form a residual leach liquor of relatively low percentage in copper as compared with its original copper content, collecting and drawing off the copper from the bottom of the precipitating tank, and continuously drawing off the leach liquor substantially free from precipitated copper from the top of the precipitating tank; substantially as described.

5. The method of extracting copper from ores, roasted matte, and other copper bearing material, which comprises leaching the material with sulfuric acid and obtaining a copper sulfate solution of a strength not substantially exceeding 1.5% metallic copper, neutralizing the free sulfuric acid contained in the solution, circulating the solution, together with sulfur dioxid, in a continuous manner through a precipitating apparatus and heating the same therein to a temperature of substantially 150° C. and a pressure of substantially 100 pounds to the square inch, the concentration of the sulfur dioxid not exceeding substantially the concentration of the copper in solution expressed in percentage by weight, and thereby effecting substantially quantitative precipitation of the copper and forming a residual leach liquor of relatively low percentage in copper as compared with its original copper content, drawing off such leach liquor in a continuous manner, and circulating the same and the ingoing solution in heat interchanging relation with each other, and thereby cooling the hot leach liquor and preheating the ingoing solution, utilizing the thus cooled leach liquor to extract a further portion of copper from the ore or other material treated, and continuing the process in the manner indicated; substantially as described.

In testimony whereof I affix my signature.

EDWARD RAY WEIDLEIN.

Copies of this patent may be obtained for five cents each, by addressing the "Commissioner of Patents, Washington, D. C."